March 3, 1959 H. D. LATHROP ET AL 2,875,624
BELT DRIVE
Filed July 25, 1955 2 Sheets-Sheet 1

INVENTORS:
Harry D. Lathrop and
BY Julius J. Barski,
Dawson, Tilton & Graham,
ATTORNEYS.

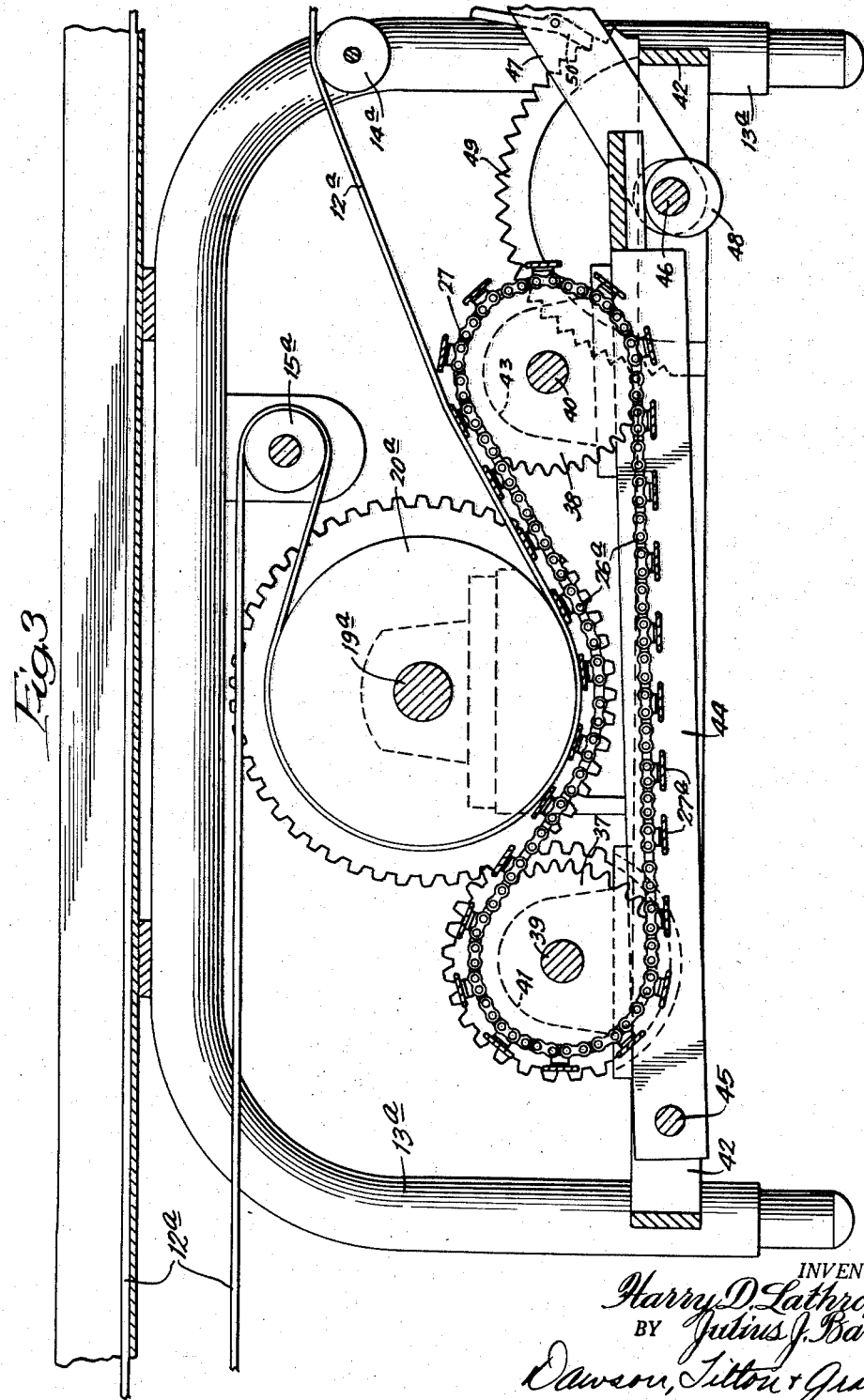

United States Patent Office

2,875,624
Patented Mar. 3, 1959

2,875,624

BELT DRIVE

Harry D. Lathrop and Julius J. Barski, Chicago, Ill., assignors to The Lathrop-Paulson Company, Chicago, Ill., a corporation of Illinois Application July 25, 1955, Serial No. 524,219

6 Claims. (Cl. 74—216.5)

This invention relates to a belt drive, and more particularly to a structure in which a belt engages the cylindrical portion of a drum and is urged into effective engagement therewith by spaced grip bars, whereby the belt is engaged on both sides by driving means for the effective operation of the belt.

In many operations, it is found that the belt tends to slip upon the drive drum and effective operation is not obtained. Particularly is such slipping tendency experienced in hardening rooms or refrigeration chambers, and also under adverse conditions in other areas. While the belt may be tightened upon the drum, this imposes excessive wear upon the portion of the belt contacting the drum, and frequent tearing of the belt occurs. The belt particularly is vulnerable under conditions of extreme cold, as in hardening rooms, when the belt portion is stiff and excessive strain brings about a tearing of the belt.

There has long been a need for a mechanism which could be employed with an endless belt and a drum receiving a looped portion thereof for bringing about effective driving of the belt without causing undue strain thereon and tearing the same.

An object of the present invention is to provide a simple and effective means for driving a belt effectively under cold and other adverse conditions, while at the same time protecting the belt against tearing or disintegration. A further object is to provide, in combination with the cylindrical surface of a drum which receives a looped portion of the endless belt, means whereby a gripping of the exterior side of the belt against the drum is brought about while at the same time employing such a gripping means that tearing of the belt is avoided. Yet another object is to provide in such a structure spaced grippers or bars which periodically engage an exterior surface of the belt for gripping the same. Other specific objects and advantages will appear as the specification proceeds.

Figure 1:
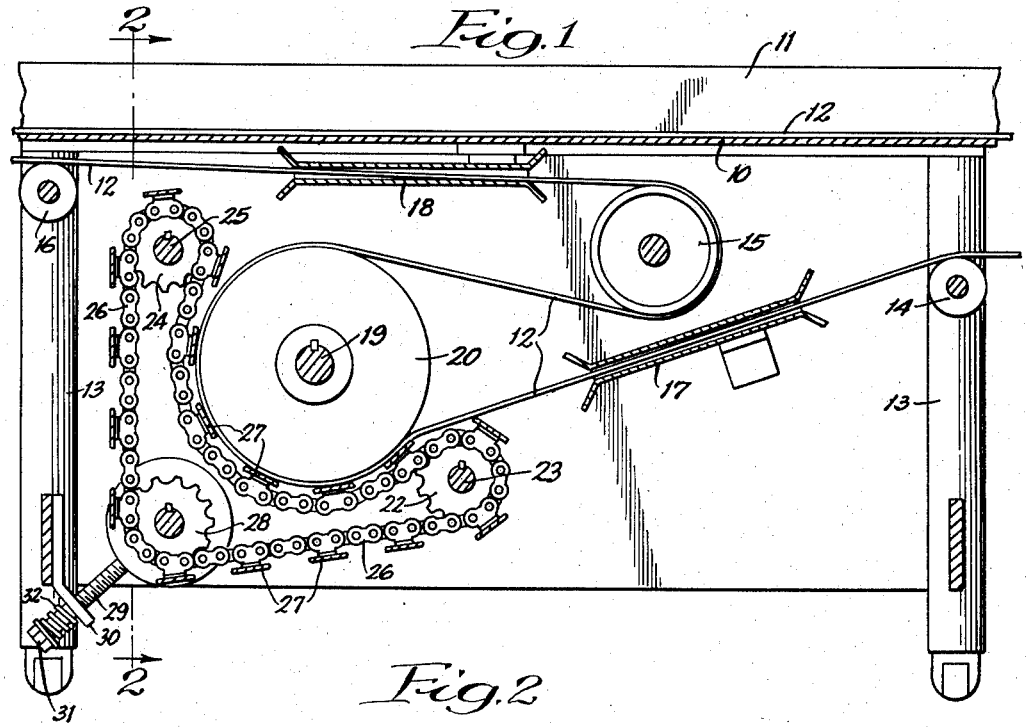
Figure 2:
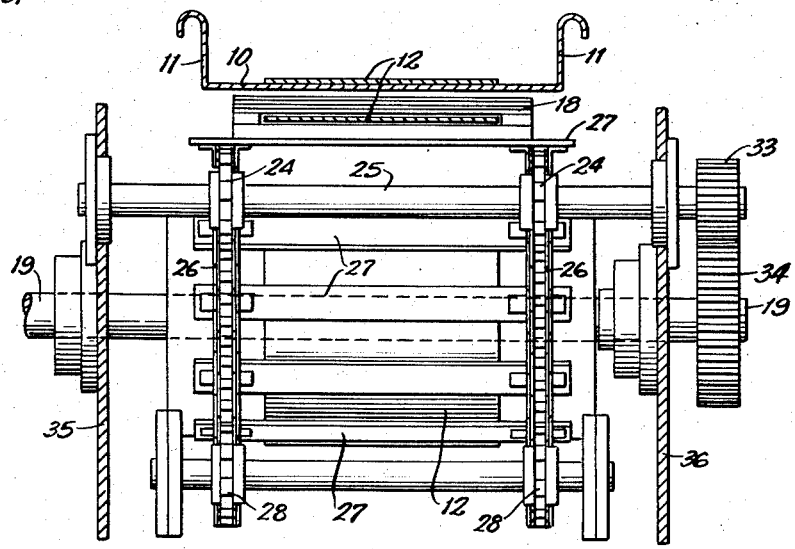

The invention is shown, in an illustrative embodiment, by the accompanying drawing, in which Figure 1 is a broken vertical sectional view of belt conveyor apparatus and drive means embodying our invention; Fig. 2, a transverse sectional view, the section being taken as indicated at line 2—2 of Fig. 1; and Fig. 3, a vertical sectional view, similar to Fig. 1, but showing a modified form of the invention.

In the illustration given in Figs. 1 and 2, 10 designates a belt-supporting bed equipped with side walls 11 and carrying a portion of the endless belt 12. The bed 10 is supported by standards 13 or by any other suitable means. The endless belt 12 has an upper portion extending over the bed 10 and a return portion extending below the bed 10. In the specific illustration given, the portion extending below the bed 10 extends over rollers 14, 15 and 16 and through guide boxes or frames 17 and 18. A drive shaft 19 carries a cylindrical drum 20 having its outer surface engaging a looped portion of the belt 12, as shown best in Fig. 1. Since the structure described for supporting a continuous belt is well known in the art, a further detailed description herein is believed unnecessary.

The drum 20 may be provided merely with a smooth cylindrical surface adapted to receive the belt 12, or, if desired, the drum may have its outer belt-receiving surface provided with asbestos fibers or similar corded material which is glued to the exterior surface of the drum to provide a slightly roughened surface for engagement with the belt 12.

In order to bring about the desired gripping action for effectively driving the belt under cold and other adverse conditions while at the same time avoiding injury to the belt, we provide spaced bars or slats which are so arranged as to be brought successively at spaced intervals into engagement with a semi-circular portion of the belt extending about the drum 20 so as to press these spaced portions of the belt against the drum. By so doing, it is found that an effective gripping of the belt is effected with the pressure exerted on both sides of the belt, while at the same time there is provided a play between the spaced bars or slats preventing an undue strain upon the stiffened belt and thus tear is avoided. The belt portions affording play between the spaced bars apparently enable the belt to adjust itself to any undue strains and stresses, and the belt does not disintegrate or tear even though a heavy load is placed upon it.

Any suitable means for carrying the slats or bars so as to cause them to successively engage the belt may be employed. In the illustration given, we provide a pair of sprockets 22 mounted on a shaft 23. On the opposite side of the drum 20, we provide a second pair of sprockets 24 mounted on a shaft 25, and each pair of sprockets carries a chain 26. Fixed upon spaced links of the chain 26 are the bars or slats 27. The slats 27 preferably have flat front surfaces which bear against the drum, as illustrated best in Fig. 1, in successive gripping movements.

Each of the chains 26 also engages a third sprocket gear 28 mounted upon a screw-shaft 29 passing through an apertured support 30, and an adjustment nut 31 is provided in connection with a spring 32 for moving the sprocket 28 for tightening the chain 26 engaged therewith.

In order to drive the upper sprockets 24 mounted on shaft 25, we equip the shaft 25 with a gear 33 meshing with a larger gear 34 carried by the drive shaft 19. The shaft 25 is mounted on either side in bearings provided by the side frame walls 35 and 36. It will be understood that any suitable means may be provided for driving the main drum and the grip shaft 25, but we prefer the simple gear connection arrangement shown, particularly because the gears are mounted entirely outside of the area in which the belt 12 is carried so that there is no possibility for the gear drive means to come in contact with portions of the belt.

In the operation of the structure, the drive shaft 19 is set into operation by reason of connections (not shown) with a motor or other source of power, and by means of the gear connections, drive shaft 25 is also set in motion. As the belt 12 moves about the cylindrical face of the drum 20, the chains 26 move in the same direction, carrying gripper bars 27 which are planted successively against spaced portions of the belt and travel at the same speed and in the same direction with the belt throughout a semi-circular portion of the drum. We have discovered that the implanting of spaced bars against the exterior side of the belt is highly effective in tying the belt to the drum and in exerting a pull against the belt from both sides thereof, and this important result is achieved without having any exposed drive connections between the two endless belt members and adjacent the main belt.

In the modification shown in Fig. 3, the frame member 13a is arcuate in shape and provides a support for the small belt pulley 15a receiving belt 12 and also for the small belt pulley 14a. The belt 12a extends about a main drum 20a similar to drum 20 as described in Figs. 1 and 2.

In order to bring about the desired gripping action for effectively driving the belt 12a under cold and other adverse conditions while at the same time avoiding injury to the belt, we provide the pairs of grip belts or chain belts 27 with spaced bars or slats 27a and the pairs of chains 26 are carried upon sprockets 37 and 38, the sprocket 37 being mounted upon shaft 39, and the sprocket 38 being carried by shaft 40.

A bearing 41 for the shaft 39 is supported upon a fixed frame 42 anchored to the supporting standard or frame 13a. The bearing 43 for the sprocket shaft 40 is mounted upon a movable frame 44 pivotally mounted at one end upon the frame 42 by the pivot pin 45. The opposite end of the movable frame 44 is adapted to be raised or lowered to change the elevation of the bearing 43 and to tighten or loosen the chain against the drum 20a. Any suitable means for vertically adjusting the frame 44 may be employed. In the illustration given, we provide a shaft 46 mounted within the frame 42 and equipped with an actuating lever or bar 47 for rotating the shaft 46. Fixed upon the shaft 46 is a cam 48 adapted to engage the frame 44 and to raise the same. A latch rake 49 in the form of an arc is secured to the frame 42 and the teeth thereof are adapted to engage a latch pawl 50 which is pivotally mounted upon the lever 47.

In the structure shown in Fig. 3, we dispense with a tightening sprocket and employ only the two bearings 41 and 43. With this structure, the chains wrap around the drum 20a to a greater extent when the bearing 43 is raised, and a very tight grip on the main drum is brought about without damaging stress on the sprocket members or their bearings. When the drum 20a is driven simultaneously with one or both of the sprockets, an effective gripping of the belt 12a on both sides thereof is accomplished, with the pressure upon the belt being exerted at spaced points along the belt.

In the operation of the structure shown in Fig. 3, the drum 20a may be driven and one or both of the sprockets 37 and 38 may be driven, whereby successive spaced slats or bars 27a are brought into engagement with the belt upon the bottom side of the drum 20a, the extent of such gripping action being controlled by the degree of elevation of the bearing 43. The bearing support 44 is locked in any selected position by the pawl 50 engaging the teeth of the rake 49. The structure shown provides an extremely compact arrangement, with the tightening structure occupying space largely below the main drum and in a position for effective tightening when this is desired.

In the modification shown in Fig. 3, the main shaft 19a driven by the motor (not shown) carries a large gear meshing with the gear carried by shaft 39. The chain 26a connects the gear on shaft 39 with the sprocket gear 38 on shaft 40 whereby both sprocket gears are thus driven. By the means shown, the pull on both sides of the belt is equal and a much better gripping effect is brought about.

While in the foregoing specification, we have set forth a specific structure in considerable detail for the purpose of illustrating an embodiment of the invention, it will be understood that such details of structure may be varied widely by those skilled in the art without departing from the spirit of our invention.

We claim:

1. In combination with an endless belt and a drum having a cylindrical surface carrying a looped portion of the belt, frame means rotatably supporting said drum, sprocket members rotatably mounted on said frame means on opposite sides of said drum and arranged in pairs, a chain carried by each pair of said sprocket members to provide an arcuate portion following one arcuate portion of said drum, and gripper bars secured at their ends to said chains and adapted to be brought successively into engagement with a portion of said belt about said drum, the sprocket members at one side of said drum being movably mounted on said frame means for movement thereon in an arcuate path to increase the length of the bar equipped chain brought into contact with said belt on said drum.

2. In combination with an endless belt and a drum having a cylindrical surface carrying a looped portion of the belt, frame means rotatably supporting said drum, a pair of spaced sprocket members rotatably mounted on said frame for rotation on opposite sides of said drum and below the center thereof, said sprocket members being arranged in pairs, a chain carried by each pair of said sprocket members to provide an arcuate portion following the lower arcuate portion of said drum, and gripper bars secured at their ends to said chain and adapted to be brought successively into engagement with a portion of said belt about the bottom portion of said drum, the sprocket members at one side of said drum being movably supported on said frame means for arcuate movement in a direction toward said drum.

3. A grip device adapted for engaging a belt to grip the same about a drum rotatably mounted on said frame means, said grip device comprising an endless belt equipped with spaced laterally-extending bars and rotary means supported on said frame means and disposed on opposite sides of said drum for supporting said endless belt so as to bring an arcuate portion thereof adjacent the bottom portion of said drum, transverse bars carried by said endless belt and adapted to be brought into successive engagement with said first-mentioned belt and to press the same against the bottom portion of said drum, and means for driving said endless belt, the rotary means disposed at one side of said drum being movably supported on said frame means for arcuate movement in a direction toward said drum.

4. In combination with an endless belt and a drum having a cylindrical surface supporting a looped portion of the belt, frame means rotatably supporting said drum, a pair of spaced sprocket members rotatably mounted on said frame on opposite sides of said drum, the sprocket members at one side of said drum being carried by a shaft movably carried by said frame means for arcuate movement in a direction toward said drum, a chain carried by said sprockets to provide an arcuate portion following an arcuate portion of said drum, gripper bars secured to said chain and adapted to be brought into engagement successively with a portion of said belt on said drum, and means for shifting said movable sprocket shaft to increase or decrease the length of the chain supporting gripper bars in engagement with the belt on said drum.

5. The structure of claim 4, in which a lever-actuated cam is employed for shifting the mounting of the movable sprocket shaft.

6. In combination with an endless belt a drum having a peripheral surface carrying a looped portion of the belt, frame means rotatably carrying said drum, a pair of spaced shafts rotatably mounted on said frame means on opposite sides of said drum, at least one of said shafts being supported upon a movable mounting on said frame means for movement in an arcuate path in a direction toward said drum, belt-supporting means carried by said shafts, an endless grip belt carried by said belt-supporting means for engagement with the belt carried on said drum, and means for moving said movable mounting for increasing or decreasing the wrap-around by said gripper belt of the belt carried by said drum, whereby greater or lesser gripping of the endless belt on said drum is effected.

References Cited in the file of this patent
UNITED STATES PATENTS 2,741,133    Barski et al.      Apr. 10, 1956

FOREIGN PATENTS 3,047    Great Britain      July 28, 1876
601,826    Great Britain      May 13, 1948